United States Patent [19]

Park

[11] Patent Number: 4,929,030
[45] Date of Patent: May 29, 1990

[54] STATIONARY MEMBER ON AUTOMOTIVE HUB CAP

[76] Inventor: Seung M. Park, #92-12, Yonhee-2dong, Seodaemunku, Seoul, Rep. of Korea

[21] Appl. No.: 302,895

[22] Filed: Jan. 30, 1989

[30] Foreign Application Priority Data

Feb. 2, 1988 [KR] Rep. of Korea .................. 88-1204

[51] Int. Cl.$^5$ ............................................... B60B 7/00
[52] U.S. Cl. ................................ 301/37 N; 301/37 R
[58] Field of Search ............ 301/37 R, 37 N, 37 CM, 301/108 R, 108 A, 108 TW

[56] References Cited

U.S. PATENT DOCUMENTS 4,280,293 7/1981 Kovalenko et al. ......... 301/37 N X

Primary Examiner—Russell D. Stormer

[57] ABSTRACT

A hub cap for an automobile wheel, the hubcap having, at its center, a static lateral axis supported by a bearing and a bushing with ribs at the center of the static axis, a supporting plate fixed to the inner side of the hub cap and supporting the bearing and bushing, a clutch plate fixed at one of its ends to the inner end of the lateral axle, the clutch plate having an eccentric bob fixed at its other end, a static member fixed to the outer end of the lateral axis and having a second eccentric bob connected thereto, a rear cover connected to the inner side of the hub cap and covering the support plate and clutch plate and a lubricating oil supply between the rear side of the hub cap and the rear cover.

2 Claims, 4 Drawing Sheets

4,929,030

STATIONARY MEMBER ON AUTOMOTIVE HUB CAP

SIMPLE DESCRIPTION OF DRAWINGS

DESCRIPTION OF NUMERAL CODES FOR THE MAJOR PORTIONS OF THE DRAWINGS 11, 111, 112: Stationary Member
12, 122: Hub Cap
13, 131: Stationary lateral axle
14: Bushing
15, 151, 152: Supporting Plate
16: Bearings
161: Roller Bearings
17: Rib
171: Ring
18: Groove
19, 23, 24, 26: Bolts
20, 231, 241: Nuts
21, 25: Eccentric Bob
22, 221: Clutch Plate
27: Boss
28, 281: Screws
29: Cover
30: Ventilation hole

DETAILED DESCRIPTION OF THE INVENTION

The present invention relates to an automobile hub cap with a stationary member thereon capable of maintaining static condition during the operation of the automobile and rotation of the wheel with the hub cap of the invention mounted thereon. The hub cap under this present invention has a name, symbol or other indicia, on the stationary member which maintains a static condition, in harmony with its desired decorative effects, in order to improve the advertising effects, and the like, of the same time while the vehicle wheel and hub cap are rotating.

In line with the recent industrial development, the advertising media have developed in variety, and nowadays ceaseless flows of automobiles can be seen on the street in any city.

The present invention is designed to use, as an advertising medium, the hub cap put on the wheel drum for ornamental purpose. The purpose of this present invention is to fix on the center of the rolling hub cap a member that can maintain its static condition and powerfully attract careful attention of the passers-by, that the most use of the highly congested road space in cities may be assured for an advertising medium by putting an advertising plate on the hub cap of the automobiles jamming the street, and, further, that the automobile may be provided with hub caps with static members that will greatly enhance the ornamental and advertising effects of the hub caps.

This present invention is largely characterized with the effects of catching the eyes of passers-by by putting the stationary member capable of maintaining its static condition and the rotating hub cap in mutual harmony.

Under this present invention, a static lateral axle at the center of the hub cap is supported by a bushing and bearings, and the static lateral axle is provided with a rib at its middle. The bushing is installed at the center of the hub cap and the bearings are fixed with nuts on a supporting plate fixed on the boss of the hub cap with screws.

At the inner end of the static lateral axle is a clutch plate fixed to an eccentric bob by screws. The static or stationary member has a second eccentric bob fixed at the outer end of the static lateral axle.

The shape of the eccentric bob on the static or stationary member is characterized by a shape of windbreaks having intervals of a certain distance to the static or stationary member and having ventilation holes.

Figure 1:
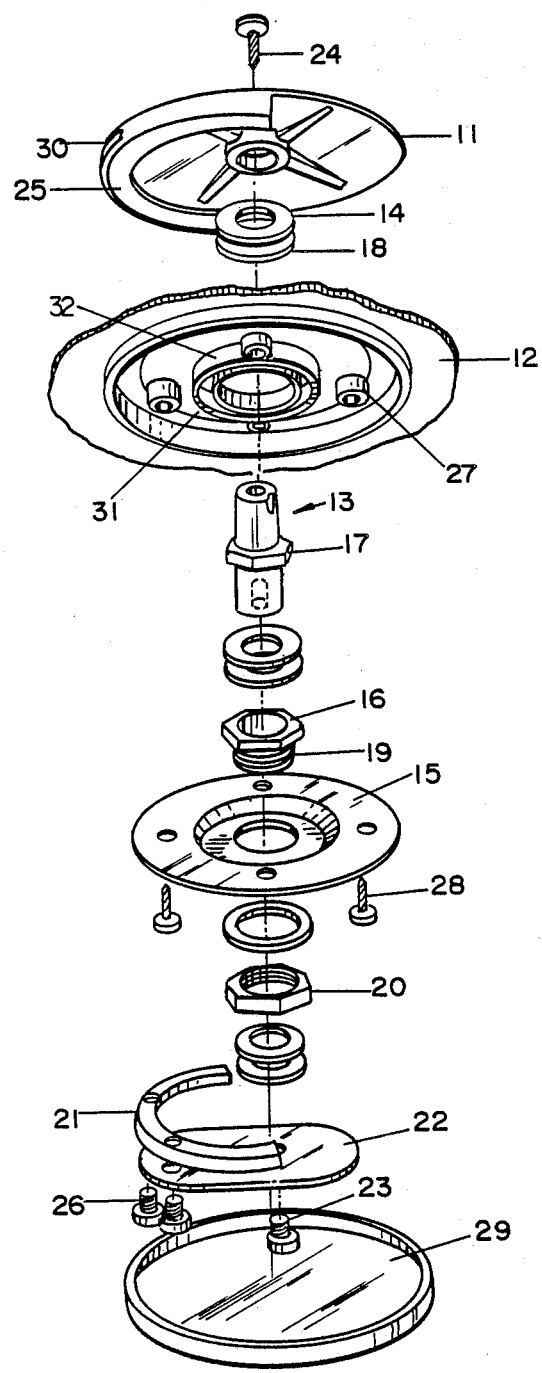
FIG. 1 is a perspective exploded view of the hub cap of invention.
Figure 2:
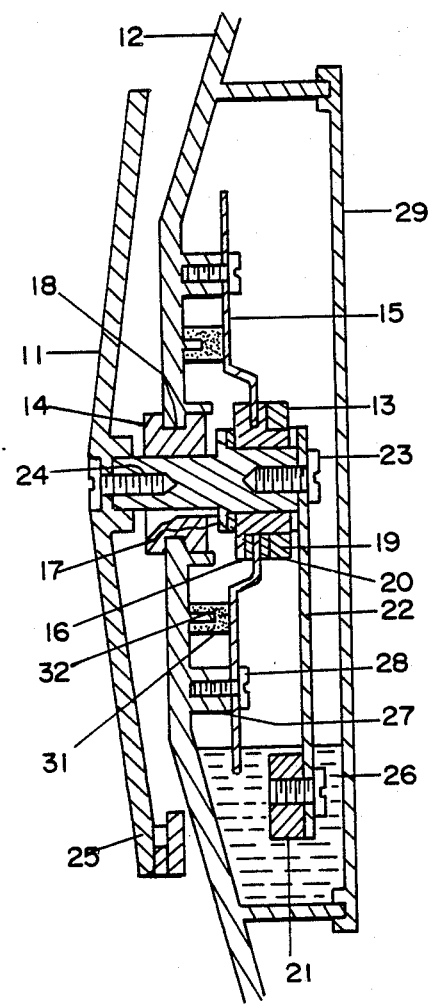
FIG. 2 is a cross-sectional view of the assembled hub cap of FIG. 1.
Figure 3:
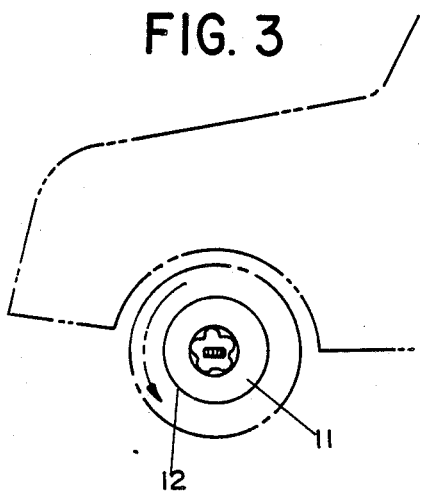
FIG. 3 is a side elevational view of the hub cap of the invention mounted on the wheel of a vehicle.

The detailed description of the present invention is made as follows in accordance with the drawings attached herewith:

FIGS. 1 and 2 illustrates an example of application of this present invention.

The static or stationary member (11) is fixed on the static lateral axle (13) supported at the center of the rolling hub cap (12).

The hub cap (12) moves under a variety of condition in accordance with the operation conditions of the automobile, such as stopping, slow running, and speedy running. The static or stationary member (11) is largely a static part that maintains a stationary condition. Therefore, by harmonizing these two mutually contrasting parts together, they can readily catch the eyes of passers-by and invite the attention of the general public to the name, symbol, or other indicia, such as advertising; thereon.

To harmonize these parts together, a variety of colors can be made available with various forms, such as brown-colored concentric circle or a radial form for the rolling portion, and a circle, a triangle, a star shape, or a form of heart.

The static lateral axle (13) is supported by the bearings that are installed on the bush (14) and the supporting plate (15) at the center of the hub cap, and the central rib (17) is formed between the bush (14) and the bearing (16) so that a fixed distance may be maintained between the static or stationary member (11) and the hub cap (12).

In other words, the rib (17) has a function to maintain the static lateral axle (13) under stable condition without being detached.

The bearing (16) can be assembled with the bolt (19) and the nut (20), and, may be changed for convenience' sake during manufacturing.

The clutch plate (22) is fixed at one end by the bolt (23) to the end of static lateral axis 13 with eccentric bob (21) fixed to the other end of clutch plate 22 by screw 26. A second eccentric bob (25) is provided at the lower part of the static or stationary member (11) fixed at the outer end of the static lateral axle (13). Therefore, the static or stationary member 11 can maintain its stability and static condition even during rotation of the hub cap (12).

The total weight of first and second eccentric bobs (21) and (25) should be large enough to hold the static or stationary member (11) with gravity during the rotation of the hub cap.

The shape of the eccentric bob (25) is in the form of a windbreak having an interval of a certain length between the static or stationary member (11) and (25) bob itself. A ventilation hole (30) is provided to insure a smooth flow of the air of this interval. The eccentric bob (25) receives a more stable air resistance during the operation of the automobile, making the static or stationary member (11) more stable.

The eccentric bob, just as a static or stationary member (11), can be manufactured through the selection of an appropriate way and assembled with the bolt (26) or with an adhesive.

The supporting plate (15) is fixed in the hub cap (12) on the boss (27) with the screw (28) or can be fixed by using an adhesives without the screw.

The bearing (16) and plate (15), respectively inside of the hub cap (12), are protected from external moisture or dust as their covers are sealed by an adhesive or liquid bond.

In the space formed between the hub cap (12) and its cover (29) is stored with lubricating oil to smooth the action of the bearing (16).

With a ring-shape sealing rubber (31) provided between the hub cap (12) and the supporting plate (15), the lubricating oil is made not to leak at all into the space between the the static lateral axle (13) and the bush (14).

The ring-shape sealing rubber (31) is made to be inserted between the four pins (32) placed inside the hub cap (12).

Figure 4:
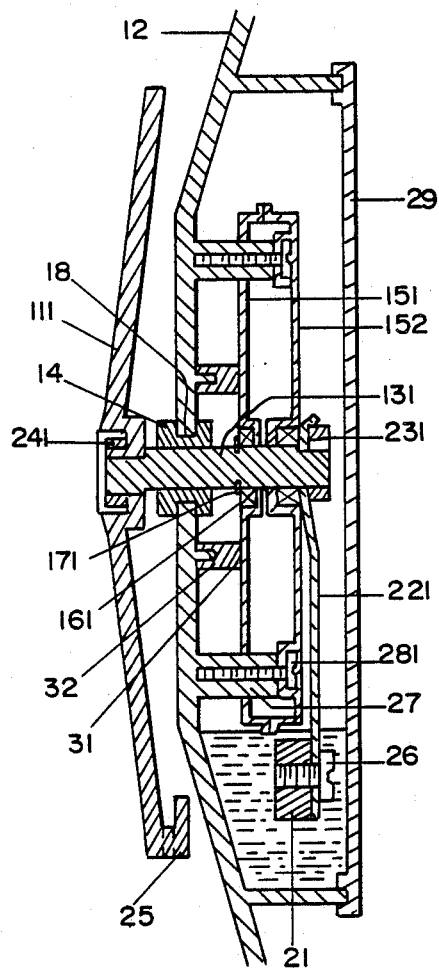
FIG. 4 is a cross-sectional view of a second embodiment of the hub cap of the invention.

The following is the explanation on this present invention for other applications:

As indicated in FIG. 4, the inner and outer ends of the static lateral axle (131) are provided with a flat portion and a spiral form which respectively play a role of the key grooves. These flat portions are in gear with the key groove formed on the static or stationary member (111) and the clutch plate (221), and the static or stationary member (111) and the clutch plate (221) are fixed respectively by the nuts (231) and (241).

By installing the roller bearing (161) between the supporting plates (151) and (152) and the static lateral axle (131), allows relative movement between the clutch plate (151) and (152) and the static lateral axle (131).

The snap ring (171) maintains a fixed distance between the static or stationary member (111) and the hub cap (12) by preventing the roller bearing (151) from being detached and by keeping the static lateral axle (131) from being loosened.

The two support plates (151) and (152) are fixed on the boss (27) by the screw (281) in a form overlapping each other.

The other structure and the principle of operation are the same as the first embodiment and, therefore, their explanation is omitted here.

Figure 5:
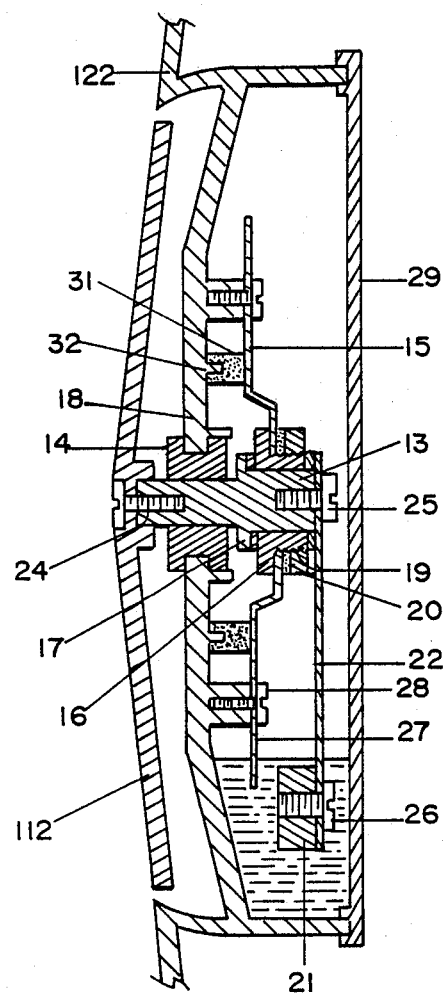
FIG. 5 is also a cross-sectional view of still another embodiment of the hub cap of the invention for other application.

Another embodiment of this present invention is as indicated in FIG. 5.

In this embodiment, the shape of the hub cap (122) is made for close approximity to the edge of the circumference of the static or stationary member (112), and, for this reason, not only will it be possible to enhance ornamental effects but also it can keep the moisture from snow or rain during the winter season from getting into the space between the hub cap (122) and the static or stationary member (112). Thus, it is possible to solve in advance the problem of simultaneous rolling of the static or stationary member (112) and the hub cap (122) that may be caused due to the inflow of rain water and moisture from snow, and subsequent freezing.

Also, in this example of application, the static or stationary member is not provided with an eccentric bob.

Instead, the weight of the eccentric bob (21) installed on the clutch plate (22) is large enough to sustain the static or stationary member (112) under proper condition during the rotation of the hub cap.

The other structure and the principle of operation are the same as the first embodiment, and therefore, their explanation is omitted here.

As in the foregoing, this present invention is to place the static or stationary member as an immobile part, on the hub cap of the automobile, on which the trademark of the automobile or other commercial ads can be placed with a powerful effect for catching the eyes of the general public, thereby enhancing the effectiveness of advertising the efficient use of road spaces in cities for advertising, and improving the ornamental effects of the hub cap by harmonizing the cap with the static or stationary member.

What is claimed in this invention:

1. An (The) automobile hub cap having a center on which a static lateral axle is supported by a bearing and a bushing with ribs at the center of said static lateral axle, a supporting plate fixed by screws and bosses to an inner side of said hub cap, said supporting plate supporting said bearing, said bushing and said static lateral axle supported by said bearing and said bushing; a clutch plate fixed at one of its ends to the inner end of said static lateral axle, an eccentric bob fixed to the other end of said clutch plate, a static member fixed at an outer end of said static lateral axle and on a front side of said hub cap; a rubber sealing ring between said hub cap and said supporting plate; a rear cover over a rear side of said hub cap covering said supporting plate and said clutch plate; and a lubricating oil supply between said rear side of said hub cap and said rear cover.

2. An automobile hub cap as set forth in claim 1 wherein, said static member is in close proximity to the edge of said hub cap.

* * * * *